US011622134B2

(12) United States Patent
Swaminathan et al.

(10) Patent No.: US 11,622,134 B2
(45) Date of Patent: *Apr. 4, 2023

(54) SYSTEM AND METHOD FOR LOW-LATENCY CONTENT STREAMING

(71) Applicant: Adobe Inc., San Jose, CA (US)

(72) Inventors: Viswanathan Swaminathan, Saratoga, CA (US); Sheng Wei, Los Angeles, CA (US); Srinivas R. Manapragada, San Ramon, CA (US)

(73) Assignee: Adobe Inc., San Jose, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/332,033

(22) Filed: May 27, 2021

(65) Prior Publication Data
US 2021/0289235 A1 Sep. 16, 2021

Related U.S. Application Data

(63) Continuation of application No. 13/036,927, filed on Feb. 28, 2011, now Pat. No. 11,025,962.

(51) Int. Cl.
H04N 21/2187 (2011.01)
H04N 21/61 (2011.01)
H04N 21/845 (2011.01)

(52) U.S. Cl.
CPC ..... H04N 21/2187 (2013.01); H04N 21/6125 (2013.01); H04N 21/8456 (2013.01)

(58) Field of Classification Search
CPC ........... H04N 21/2187; H04N 21/6125; H04N 21/8456
See application file for complete search history.

(56) References Cited

U.S. PATENT DOCUMENTS

| 6,044,440 | A | * | 3/2000 | Haghighi | ............ G06F 12/0897 711/E12.051 |
| 7,797,064 | B2 | | 9/2010 | Loomis et al. | |
| 2007/0112973 | A1 | | 5/2007 | Harris | |
| 2008/0133767 | A1 | * | 6/2008 | Birrer | ................. H04L 67/1063 709/231 |

(Continued)

OTHER PUBLICATIONS

"Examiner's Answer to Appeal Brief", U.S. Appl. No. 13/036,927, dated Sep. 19, 2018, 8 pages.

(Continued)

Primary Examiner — Michael R Telan
(74) Attorney, Agent, or Firm — FIG. 1 Patents

(57) ABSTRACT

Embodiments of a system and method for low-latency content streaming are described. In various embodiments, multiple data fragments may be sequentially generated. Each data fragment may represent a distinct portion of media content generated from a live content source. Each data fragment may include multiple sub-portions. Furthermore, for each data fragment, generating that fragment may include sequentially generating each sub-portion of that fragment. Embodiments may include, responsive to receiving a request for a particular data fragment from a client during the generation of a particular sub-portion of that particular data fragment, providing the particular sub-portion to the client subsequent to that particular sub-portion being generated and prior to the generation of that particular data fragment being completed in order to reduce playback latency at the client relative to the live content source.

20 Claims, 9 Drawing Sheets

(56) References Cited

U.S. PATENT DOCUMENTS

| | | | |
|---|---|---|---|
| 2011/0080940 A1* | 4/2011 | Bocharov | H04N 21/4348 |
| | | | 375/240.01 |
| 2011/0167462 A1 | 7/2011 | O'Connor et al. | |
| 2011/0238789 A1 | 9/2011 | Luby et al. | |
| 2011/0246885 A1 | 10/2011 | Pantos et al. | |
| 2011/0307545 A1 | 12/2011 | Bouazizi | |
| 2012/0054235 A1 | 3/2012 | Kitazato et al. | |
| 2012/0102157 A1 | 4/2012 | Kim et al. | |
| 2013/0132507 A1 | 5/2013 | Swaminathan et al. | |

OTHER PUBLICATIONS

"Final Office Action", U.S. Appl. No. 13/036,927, dated Feb. 26, 2015, 11 Pages.

"Final Office Action", U.S. Appl. No. 13/036,927, dated Apr. 11, 2016, 13 pages.

"Final Office Action", U.S. Appl. No. 13/036,927, dated Jul. 13, 2017, 22 pages.

"Non-Final Office Action", U.S. Appl. No. 13/036,927, dated Sep. 11, 2014, 10 pages.

"Non-Final Office Action", U.S. Appl. No. 13/036,927, dated Sep. 25, 2015, 11 pages.

"Non-Final Office Action", U.S. Appl. No. 13/036,927, dated Mar. 21, 2014, 12 pages.

"Non-Final Office Action", U.S. Appl. No. 13/036,927, dated Nov. 17, 2016, 17 pages.

"Notice of Allowance", U.S. Appl. No. 13/036,927, dated Jan. 28, 2021, 7 pages.

"Patent Trial and Appeal Board Decision", U.S. Appl. No. 13/036,927, Jul. 2, 2020, 10 pages.

\* cited by examiner

SYSTEM AND METHOD FOR LOW-LATENCY CONTENT STREAMING

RELATED APPLICATION

This application is a continuation of and claims priority to U.S. patent application Ser. No. 13/036,927 filed Feb. 28, 2011 entitled "System and Method for Low-Latency Content Streaming," the disclosure of which is incorporated by reference herein in its entirety.

BACKGROUND

Field of the Invention

The present invention is directed to computer systems. More particularly, it is directed to the transfer of content within a computing environment.

Description of the Related Art

The ubiquity of the internet has paved the way for digital distribution of content. In addition to traditional broadcast media, consumers can now view electronic content streamed over the Internet and other data networks. Despite differences in underlying methods of content delivery, content delivered over the Internet may be compared to traditional broadcast media with respect to a number of performance metrics. These metrics may include video quality and resolution, for example. For live content (e.g., sports or other live broadcasts), latency may also be a common criteria by which consumers evaluate the viewing experience. Traditional broadcast media has typically fared well in this regard, providing content to customers with negligible delay.

SUMMARY

Embodiments of a system and method for low-latency content streaming are described. In various embodiments, multiple data fragments of content may be sequentially generated; each data fragment may represent a distinct portion of media content generated from a live content source. In various embodiments, this content may be encoded according to one or more media codecs (e.g., MPEG-2 or H.264). Each data fragment may include multiple sub-portions, which may be referred to herein as chunks. For each data fragment, generating that fragment may include sequentially generating each chunk within that fragment. Embodiments may further include, responsive to receiving a request for a particular data fragment from a client during the generation of a particular chunk of that particular data fragment, providing the particular chunk to the client subsequent to that particular chunk being generated and prior to the generation of that particular data fragment being completed in order to reduce playback latency at the client relative to the live content source. In this way, instead of waiting until the entire fragment has been generated, embodiments may include providing a chunk of that fragment to the client such that the client may begin playback. This may result in reduced latency relative to a fragment only configuration that does not utilize chunks. In various embodiments, chunks may be provided to a client according to chunked transfer encoding specified by a transfer protocol.

Embodiments may also include providing a request (e.g., a client request) for a particular data fragment to a remote system (e.g., a content distribution system) including one or more computers that sequentially generate multiple data fragments that each includes multiple chunks. The remote system may sequentially generate each chunk within a given data fragment; each data fragment may represent a distinct portion of media content generated from a live content source. In various embodiments, the request may be provided during the generation of a particular chunk of a particular data fragment at the remote system. Subsequent to the particular chunk being generated and prior to the generation of the particular data fragment being completed, embodiment may include receiving that particular chunk from the remote system. Embodiment may also include initiating playback of the particular chunk prior to the generation of the particular data fragment being completed in order to reduce playback latency relative to the live content source. In this way, the client system need not wait for the entire fragment to be generated prior to receiving and playing content data from that fragment.

Figure 1:
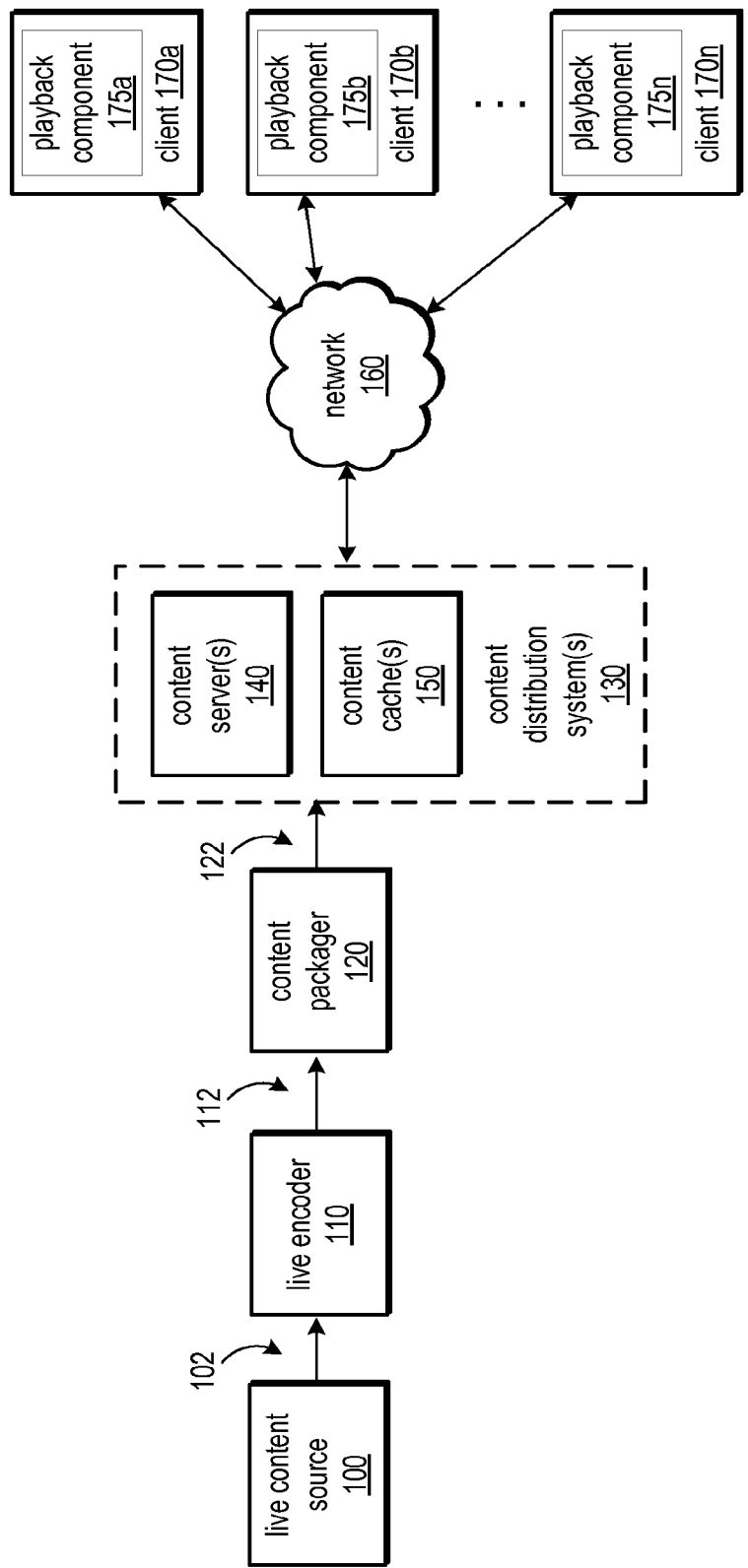
FIG. 1 illustrates a block diagram of an example system in which low-latency content streaming may be performed, according to some embodiments.

While the system and method for low-latency content streaming is described herein by way of example for several embodiments and illustrative drawings, those skilled in the art will recognize that the system and method for low-latency content streaming is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for low-latency content streaming as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for low-latency content streaming are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 illustrates a block diagram of a computing environment in which embodiments may be implemented. In the illustrated embodiment, a live content source 100 may be configured to capture an electronic representation of live events. In various embodiments, live content source 100 may include one or more video and/or audio capture devices including but not limited to professional or consumer grade video cameras and/or audio transducers (e.g., microphones). In one example, live content source 100 may capture live media content including but not limited to live sporting events, live shows or productions, or video conferences. The live content source 100 may convey an electronic representation of live content 102 to live encoder 110, either directly or through one or more intermediate devices. In various embodiments, the electronic representation of live content 102 may be streamed from live content source 100 to live encoder 110. For instance, the capture of live content may be ongoing and multiple segments of the content may be streamed to live encoder 110 in a sequential fashion.

Live encoder 110 may encode the live content according to one or more media codecs. In some embodiments, these codecs may utilize compression techniques, such as those for reducing the data size of the content while retaining most or all of the original audio and/or video quality. In various embodiments, this may include encoding the content with a codec that utilizes inter-frame compression techniques that may result in the presence of key frames and frames that are dependent upon such key frames in order to be rendered. For instance, these dependent frames may be expressed in terms of their differences relative to a key frame. A non limiting example of key frames may include an I-frame; a non-limiting example of frames dependent on key frames may include P-frames and B-frames. Non-limiting examples of codecs that may be utilized by encoder 110 to encode the live media content may include the MPEG-2, MPEG-4, and H.264 codecs. As illustrated, in various embodiments, the live encoder 112 may provide the encoded live media content 112 to content packager 120. In various embodiments, live encoder 110 may stream the encoded media content 112 to content packager 120 according to one or more streaming protocols, such as the Real Time Messaging Protocol (RTMP) or some other protocol for streaming media data.

Content packager 120 may be configured to package the encoded content 112 into packaged content 122. In various embodiments, the content packager may create the packaged content such that the content include multiple sequential fragments that represent different temporal segments of the media content. In one non-limiting example, a first fragment may represent the first 10 second time period of the content, a second fragment may represent the second 10 second time period of the content, and so on. As described in more detail below, this fragment size may be configurable. Furthermore, as also described in more detail below, the larger the fragment size, the less load exerted on content distribution system(s) 130 for a given client request load. For instance, in embodiments where one request is submitted per fragment, using a relatively small number of large fragments for a given portion of content (as opposed to a larger number of smaller fragments) may reduce the aggregate overhead that the content distribution system(s) expend on servicing requests for that portion of content.

Also described in more detail below, each fragment may include metadata and media data; the media data may be further divided into to sub-portions referred to herein as chunks. For instance, in one non-limiting example, packaged content 122 may include multiple 10 second fragments and each 10 second fragment may include 10 one second chunks. Other implementations may be used in other embodiments. For instance, in subsequent Figures, a fragment length of 4 seconds and chunk length of one second is utilized. The packaged data may be provided to one or more content distribution system(s) 130, which may be responsible for providing the packaged content to various clients. In various embodiments the chunked approach described here may reduce the latency of streaming data relative to its live source. For instance, as described in more detail below with respect to subsequent Figures, the latency when utilizing a chunk- and fragment-based approach may be less than the latency that is present when using fragments without chunks.

Figure 10:
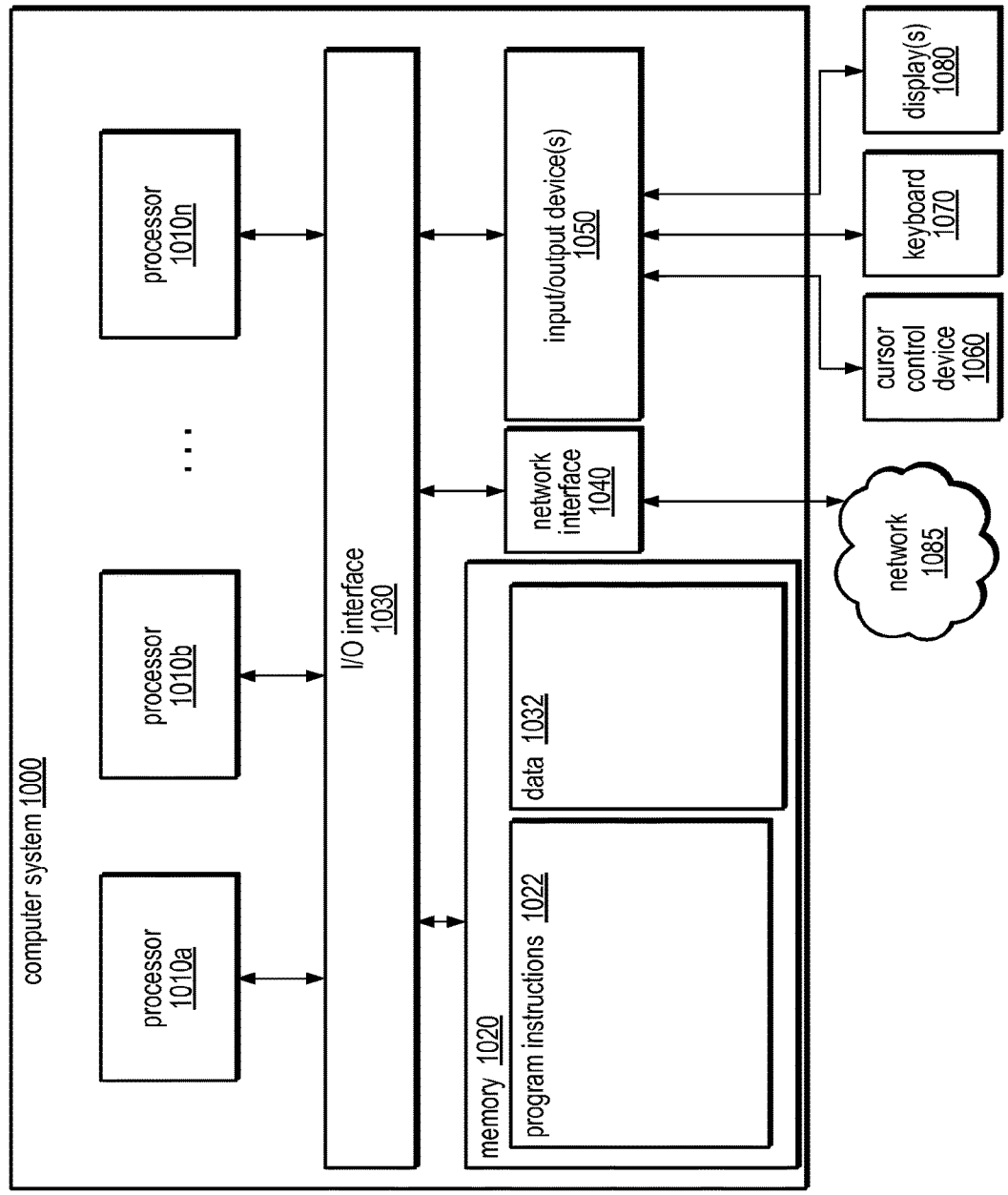
FIG. 10 illustrates an example computer system suitable for implementing various components of the system and method for low-latency content streaming, according to various embodiments.

Content distribution system(s) 130 may include one or more content servers 140 and one or more content caches 150. In some embodiments (not illustrated), one or more of the content caches may be included as part of network 160 (e.g., as Internet Service Provider (ISP) caches). As described in more detail below, clients 170a-n may request data fragments of content (e.g., fragments of packaged content 122) over network 160 (e.g., the Internet). Note that network 160 may include one or more networks, such as network 1085 of FIG. 10. In various embodiments, any communication between the illustrated components may take place over one or more of such networks.

Content distribution system(s) 130 may respond to client requests for fragment by providing such fragments to the clients. This process is described in more detail below with respect to FIG. 2. In various embodiments, when a given data fragment is requested for the first time, a content server (e.g., content server 140) may provide that fragment to the respective client that requested it. Additionally, upon this first access of the fragment, the fragment may be cached in one or more content caches 150. In this way, when the fragment is requested again (e.g., by another client), the fragment may be served from a cache 150 thereby reducing the load on content server(s) 140. In various embodiments, any of content distribution system(s) 130 may be equipped with one or more server modules for servicing requests from clients 170a-n. One non-limiting example of such a server module includes a server module configured to transfer data according to the Hypertext Transfer Protocol (HTTP), such as the Apache HTTP Server module. In various embodiments any of content distribution system(s) 130 may include computers configured to execute such a module in order to serve content to clients.

As illustrated each client system 170a-n may include a respective playback component 175a-n with which to playback fragments received from content distribution system(s) 130. In various embodiments, these playback components may include hardware and/or software configured to interpret the received data fragment and generate a video and/or audio representation of the received data fragment on a display (e.g., display 1080 of FIG. 10). In one non-limiting example, a given playback component 175 may include a stand-alone multimedia application executing on the client. In other cases, a given playback component 175 may include a plug-in or application extension of another application. For instance, a playback component may include a multimedia plug-in of a web browser. In other cases, the client may include dedicated hardware logic for media playback (or some combination of hardware and software).

Figure 2:
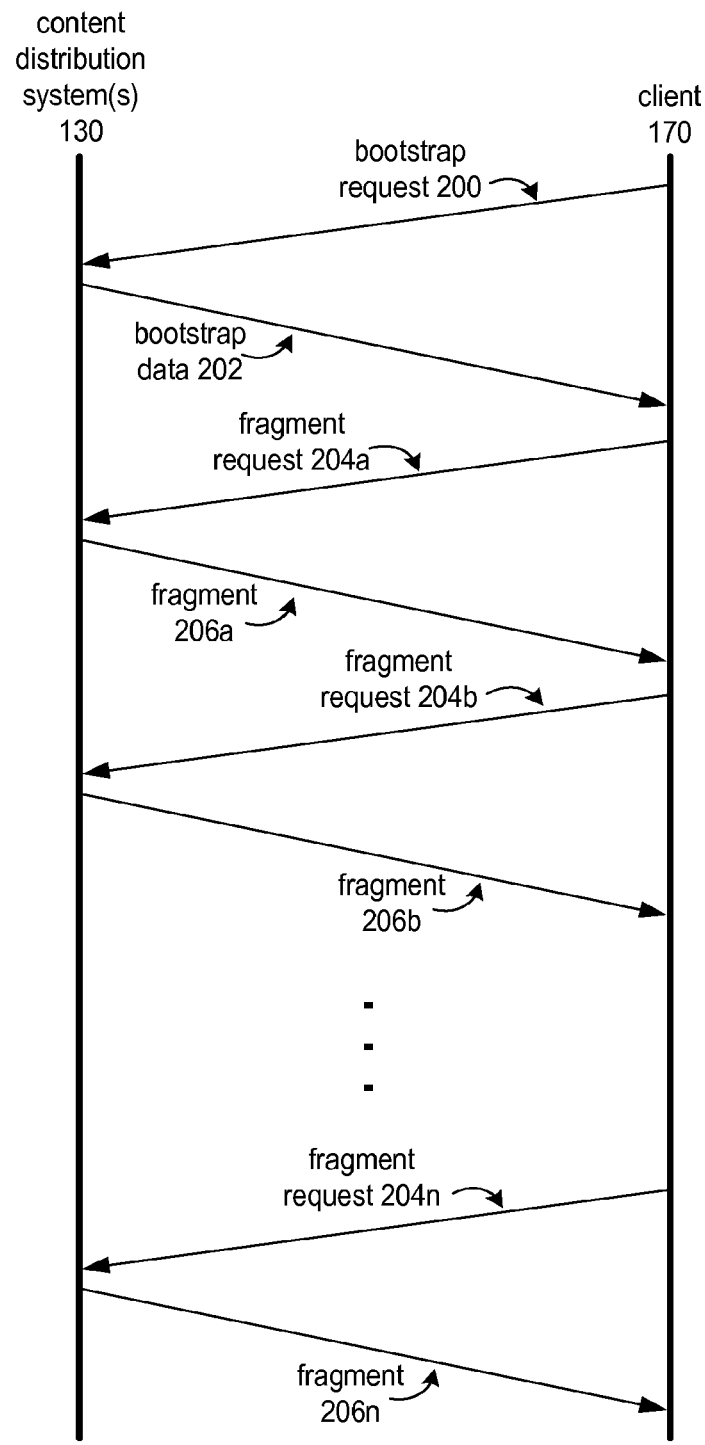
FIG. 2 illustrates a flow diagram of an example request-response protocol between a client and a server that provides data fragments, according to some embodiments.

FIG. 2 illustrates a flow diagram of an example request-response protocol between a client and a server (or cache) that provides data fragments, according to some embodiments. In the illustrated embodiment, client 170 may illustrate a given one of clients 170a-n of FIG. 1. In the illustrated embodiment, client 170 may submit an initial bootstrap request 200 to content distribution system(s) 130. In various embodiments, this request may represent a query for mapping information that maps multiple time periods to fragments of streamed content (e.g., such that the client may request the appropriate fragments at the appropriate time, as described in more detail below). Responsive to that request, content distribution system(s) 130 may respond with bootstrap data 202. Bootstrap data 202 may include a mapping between multiple time periods and respective fragments of packaged content 122. In various embodiments, for multiple fragments, the mapping may indicate an association between a specific time period and a respective fragment identifier of a fragment. For a particular fragment, this specific time period may indicate the time period (exact or approximate) during which the content represented by that fragment was captured. According to various embodiments, the client may use this bootstrap information to determine which data fragment to request. For example, the client may determine the current time (e.g., from a system clock or a network accessible time server), determine which time period of the bootstrap information includes the current time, and determine the data fragment that corresponds to that time period. In various embodiments, this may be the data fragment that is requested by the client. In various embodiments, instead of utilizing the current time (e.g., as specified by the system clock), the client may instead request the fragment that is currently being generated as specified by the bootstrap data. In some cases (e.g., FIG. 3), the client may actually request the data fragment corresponding to the time period immediately preceding the time period that includes the current time. In the illustrated embodiment, the initial fragment request is illustrated as fragment request 204a; the content distribution system(s) response (i.e., the data fragment corresponding to the request) is illustrated as data fragment 206a. In various embodiments, the client may request subsequent fragments, as illustrated by request 204b-n. Likewise, the content distribution system(s) may respond to such requests with the corresponding data fragments 206b-n.

Figure 3:
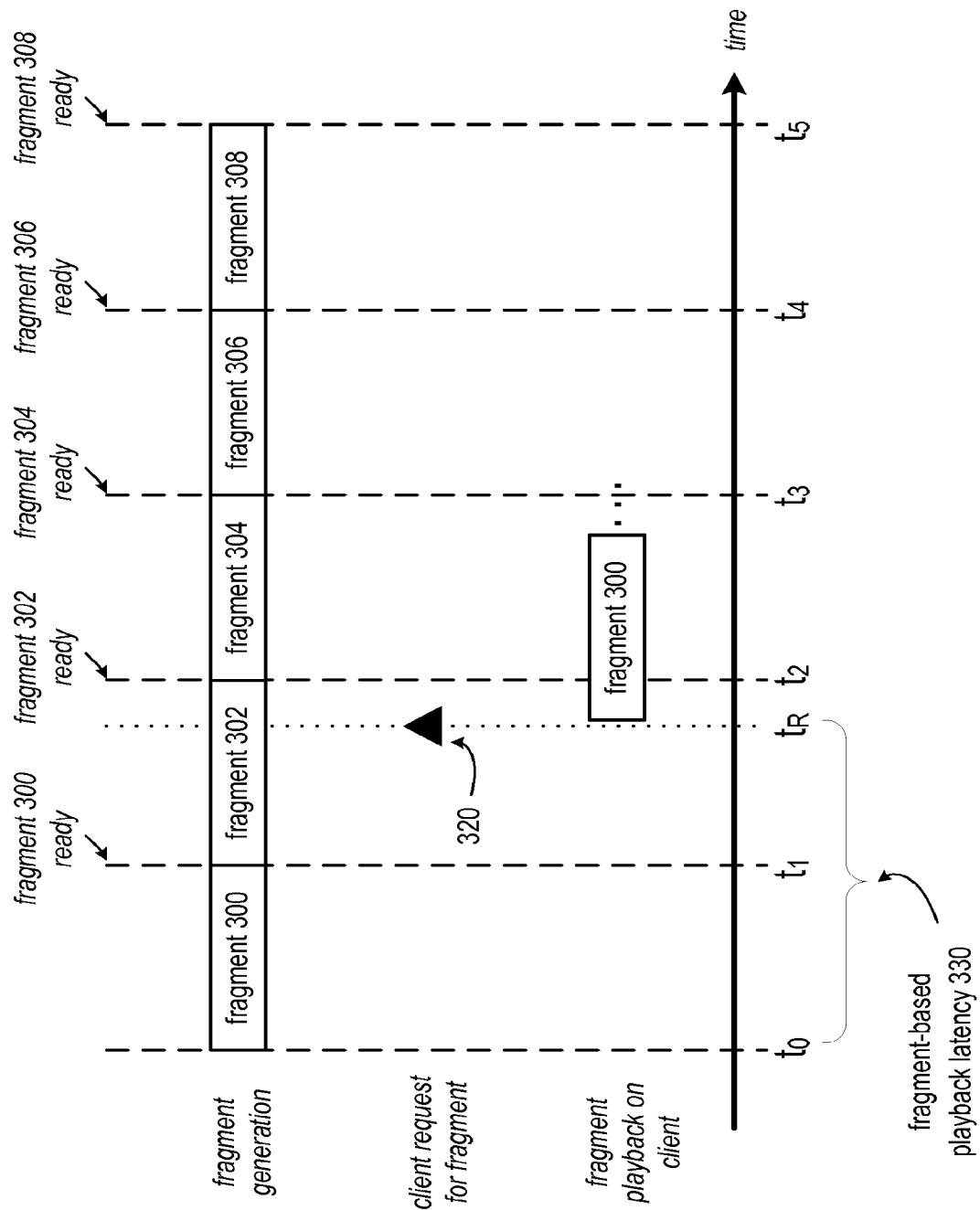
FIG. 3 illustrates an example timeline of fragment-based playback latency, according to some embodiments.

FIG. 3 illustrates a baseline implementation resulting in the longest fragment-based playback latency of the various examples described herein. In the illustrated embodiment, packaged content (e.g., packaged content 122) is illustrated as multiple data fragments 300-308, which may represent consecutive time periods of content. In one non-limiting example, data fragment 300 may represent the first 4 seconds of content, fragment 302 may represent the second 4 seconds of content, and so on. As illustrated, these fragments are packaged and ready for distribution to clients at different times due to the nature of live content distribution (e.g., content becomes available in a serial, sequential fashion). In the illustrated embodiment, fragment 300 is ready for distribution (from content distribution system(s) 130) at time t1, fragment 302 is ready for distribution at time t2, fragment 304 is ready for distribution at time t3, and so on.

In the illustrated embodiment, the client may use the bootstrap information according to the techniques described above with respect to FIG. 2, where the current time at the client is equal to or approximately tR, the time at which the fragment request is submitted from the client to the content distribution system. In the illustrated embodiment, this request is illustrated as request 320. In the illustrated embodiment, request 320 may be a request for fragment 300 (later Figures describe other techniques). In response to the request, the content distribution system may provide the request fragment 300 to the client and the client may initiate playback of the fragment. As illustrated, the playback of fragment 300 may start at approximately time tR. Note that the actual time at which playback is initiated may be slightly after time tR due to network latencies. In the configuration of the illustrated embodiment, the approximate fragment-based latency is illustrated as fragment-based playback latency 330, which is approximately equal to tR-t0.

As can be seen from the illustrated embodiment, depending upon the actual time at which request 320 for fragment 300 is submitted, the latency may vary from approximately one fragment width (e.g., t1-t0) to two fragment widths (t2-t0). For instance, as tR approaches t1, the latency in the configuration of FIG. 3 approaches one fragment width (e.g., t1-t0). Similarly, as tR approaches t2, the latency in the configuration of FIG. 3 approaches two fragment widths (e.g., t2-t0). As described in more detail below, other configurations may result in reduced latencies relative to the configuration of FIG. 3.

Figure 4:
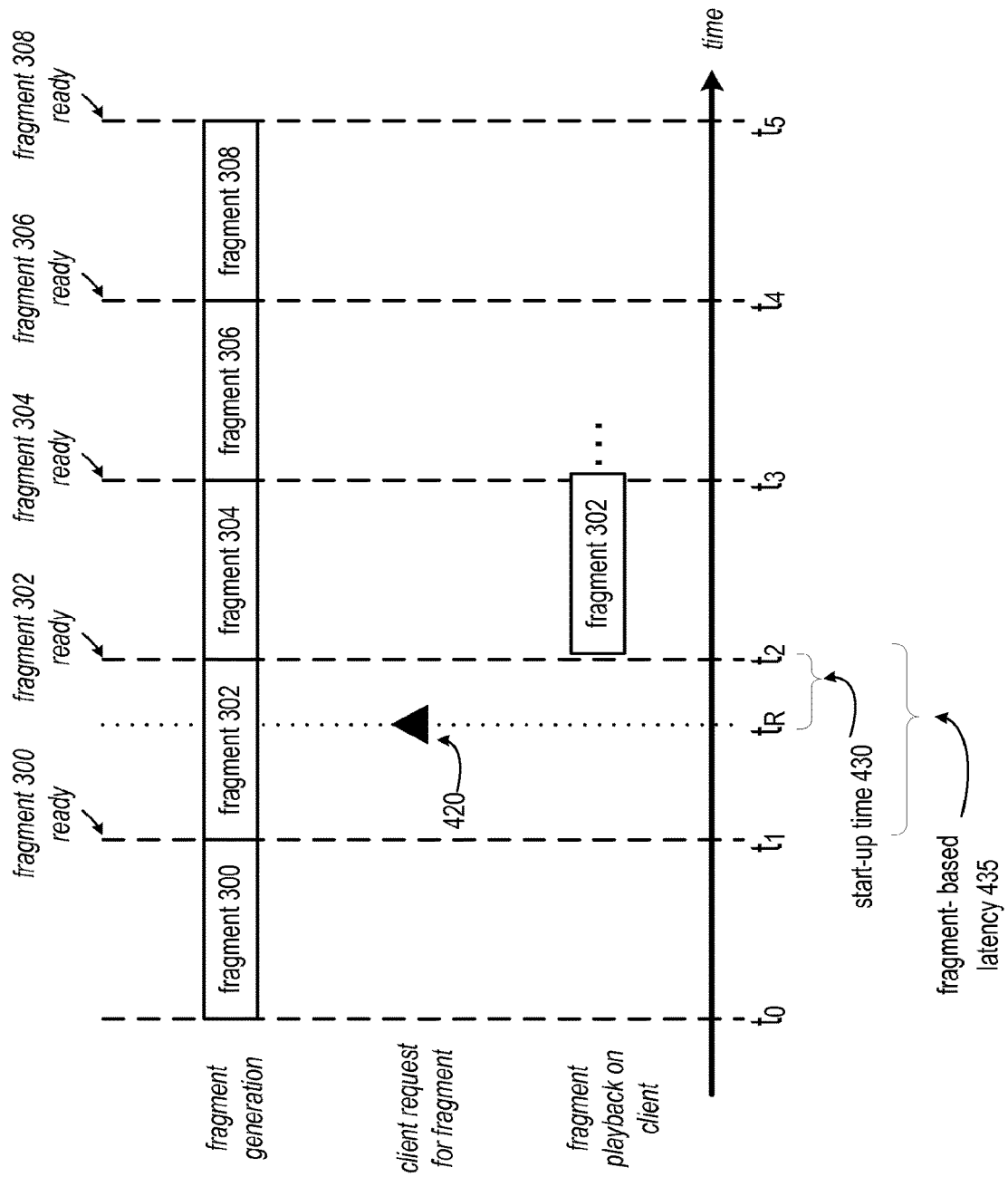
FIG. 4 illustrates another example timeline of fragment-based playback latency, according to some embodiments.

FIG. 4 illustrates a modified implementation resulting in reduced fragment-based playback latency. In the illustrated embodiment, request 420 is similar to request 320 described above, except that request 420 requests the fragment that is currently being generated at the time of the request, which in this case is fragment 302. In this case, the content distribution system(s) 130 may receive the request and return the requested fragment to the client at time t2 (this time may be approximate due to small network latencies). As illustrated, the client may receive fragment 302 and initiate playback at approximately time t2. Accordingly, the approximate startup time 430 is equal to t2-tR, with an actually latency 435 of approximately one fragment width (~t2-t1). As described in more detail below, chunk-based configurations may result in reduced latencies relative to the configuration of FIG. 4.

Figure 5:
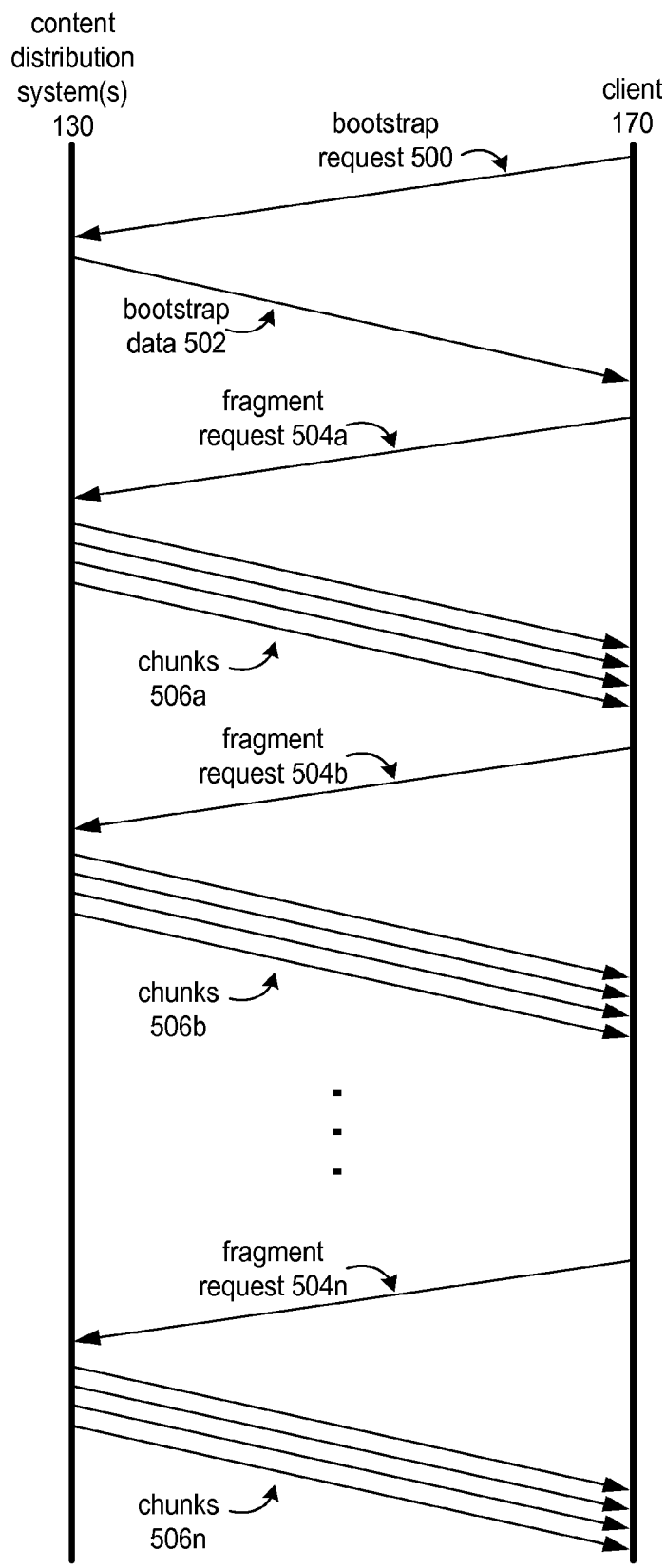
FIG. 5 illustrates a flow diagram of an example chunk-based transfer protocol between a client and a server that provides data fragments, according to some embodiments.

FIG. 5 illustrates a flow diagram of an example chunk-based transfer protocol between a client and a server (or cache) that provides data fragments, according to some embodiments. The illustrated embodiment of FIG. 5 is similar to that of FIG. 2 described with the addition of chunk-based fragment distribution. In the illustrated embodiment, client 170 may submit an initial bootstrap request 500 to content distribution system(s) 130. Responsive to that request, content distribution system(s) 130 may respond with bootstrap data 502. Similar to bootstrap data 202, bootstrap data 502 may include a mapping between multiple time periods and respective fragments of packaged content 122. In various embodiments, for multiple fragments, the mapping may indicate an association between a specific time period and a respective fragment identifier of a fragment. For a particular fragment, this specific time period may indicate the time period (exact or approximate) during which the content represented by that fragment was captured. According to various embodiments, the client may use this bootstrap information to determine which data fragment to request. For example, the client may determine the current time (e.g., from a system clock or a network accessible time server), determine which time period of the bootstrap information includes the current time, and determine the data fragment that corresponds to that time period. In various embodiments, instead of utilizing the current time (e.g., as specified by the system clock), the client may instead request the fragment that is currently being generated as specified by the bootstrap data. In various embodiments (e.g., FIGS. 4 and 6), this may be the data fragment that is requested by the client. In the illustrated embodiment, the initial fragment request is illustrated as fragment request 504a. Instead of providing the corresponding fragment to the client 170 as a single portion of data, content distribution system(s) 130 may instead provide the fragment to client 170 as one or more sequential chunks 506a of the fragment. For instance, different sub-portions of fragment may be provided to the client portion as chunks according to chunked transfer encoding specified by Hypertext Transfer Protocol (HTTP). The specific manner in which the chunked transfer is performed is described in more detail with respect to FIG. 6.

As illustrated by fragment request 504b-504n, the client may submit requests for subsequent data fragments of the content. The content distribution system(s) 130 may respond to each of such requests with chunks 506b-chunks 506n.

Figure 6:
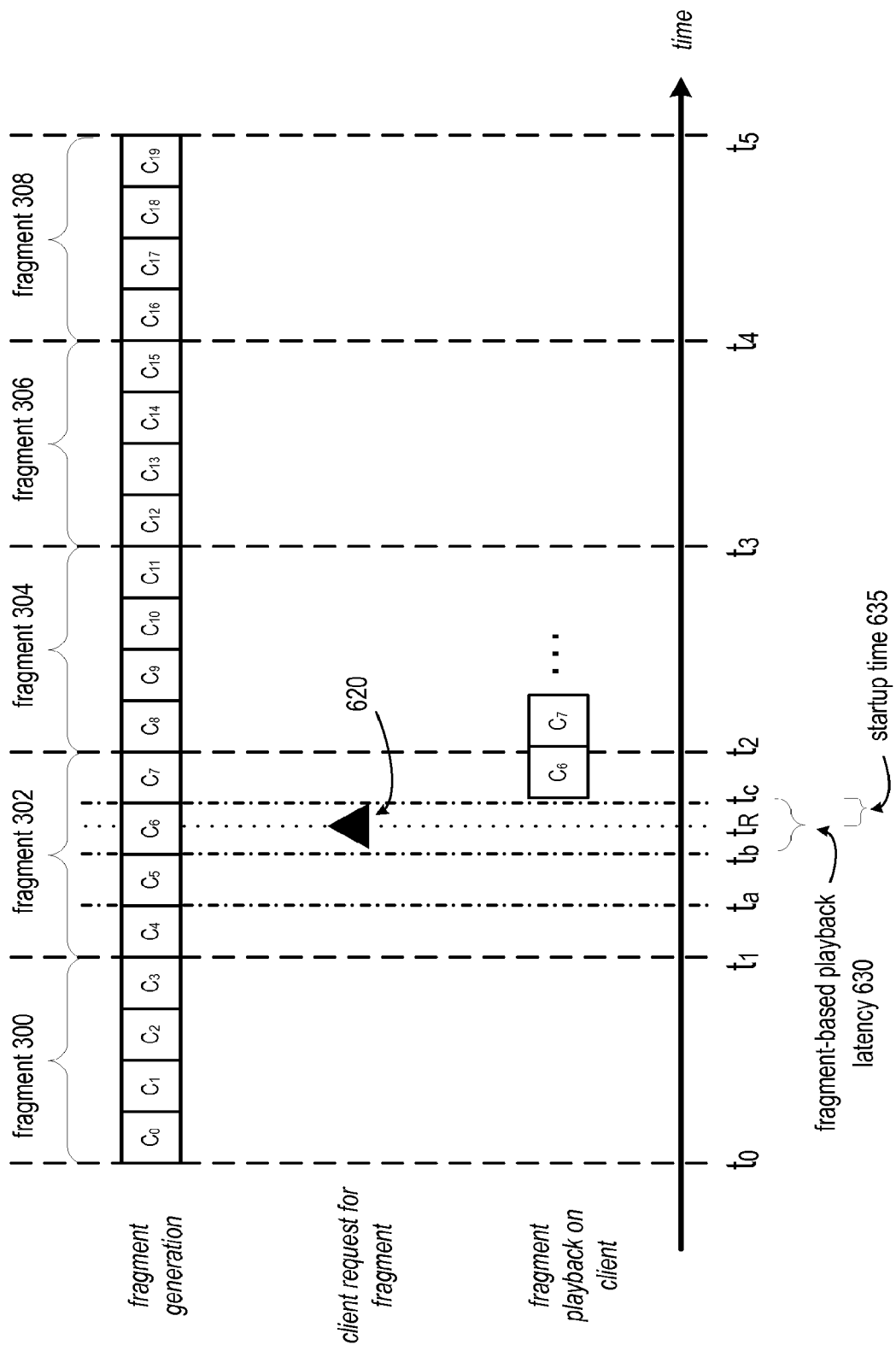
FIG. 6 illustrates an example timeline of fragment-based playback latency when utilizing a chunk-based transfer protocol, according to some embodiments.

FIG. 6 illustrates an example timeline of fragment-based playback latency when utilizing a chunk-based transfer protocol, according to some embodiments. In the illustrated embodiment of FIG. 6, the fragments are partitioned into multiple chunks. In various embodiments, the content may be formatted by content packager 120 described above in order to facilitate chunk based transfer. For instance, in various embodiments, the content packager may package the content such that it adheres to chunk-based file format, such as that of FIG. 7B described in more detail below.

As illustrated in FIG. 6, fragments 300-308, which may be the same as (or similar to) fragments 300-308 described above with respect to previous Figures, may each be broken down into multiple chunks. For instance, as illustrated, fragment 300 is represented by chunks C0-C3, fragment 302 is represented by chunks C4-C7, fragment 304 is represented by chunks C8-C11, and so on. As was the case in previous Figures, in the illustrated embodiment, fragment 300 is ready for distribution (from content distribution system(s) 130) at time t1, fragment 302 is ready for distribution at time t2, fragment 304 is ready for distribution at time t3, and so on. However, in the chunk-based approach of the illustrated embodiment, individual chunks may be transferred to a client before the entire fragment has been generated (i.e., before the entire fragment is ready). For instance, in various embodiments, under a chunk-based approach, as long as an individual chunk is ready at content distribution system(s) 130, that chunk may be distributed to a client that requested the fragment of which that chunk is a member. Taking fragment 302 as an example, chunk C4 is ready at time ta, chunk C5 is ready at time tb, chunk C6 is ready at time tc, and chunk C7 (and the fragment as a whole) is ready at time t2. Accordingly, in accordance with the chunk-based approach, if chunk C4 is ready, that chunk may be transferred to a client even if chunks C5-C7 are not yet ready. If chunk C5 is ready, that chunk may be transferred to a client even if chunks C6 and C7 are not yet ready, and so on. As described in more detail below, this characteristic will facilitate the reduction of fragment-based playback latency.

In the illustrated embodiment, the client 170 may submit request 620 for fragment 302 to content distribution system(s) 130. The client may determine that fragment 302 is to be requested according to the techniques described above (e.g., comparing the current time to the bootstrap information). As illustrated, request 620 for fragment 302 may occur during the generation of chunk C6 (after chunks C4 and C5 have been generated, but before chunk C7 has been generated). In contrast to the embodiments adhering to the approach of FIG. 4, transmission of data from fragment 302 need not wait until the entire fragment is generated. Instead, chunk C6 (as well as previous chunks C5 and C4 in some cases) may be sent from the content distribution system(s) to the client even before the remainder of fragment 302 (i.e., chunk C7) has been generated. In this way, even though request 620 is submitted around the same time as request 420 of FIG. 4, the fragment-based playback latency in the embodiment of FIG. 6 is substantially smaller. More specifically, the fragment-based playback latency is illustrated at 630 and is approximately equivalent to tc-tb (approximately one chunk), with a startup time 635 of approximately tc-tR. Note that this latency may be approximate due to small network latencies. As illustrated, playback of chunk C6 may be initiated shortly after time tc (i.e., shortly after chunk C6 is received). Likewise, chunk C7 may be initiated shortly after time t2 (i.e., shortly after chunk C7 is received).

While not illustrated, in response to request 620, the content distribution system(s) may in some cases provide chunk C4 and/or chunk C5 to the client in addition to chunk C6. In these cases, the client may initiate playback of chunks C4 and/or C5 while chunk C6 is being generated and/or delivered. While this implementation may increase the playback latency relative to just playing chunk C6 directly (when that chunk is available), it also decreases the wait time before content is played as playback of chunks C4 and C5 may begin nearly immediately (because such chunks are already generated and available at time tR). In other cases, even when chunks C4 and C5 are provided to the client, the client (e.g., playback component of the client) may decide to discard such chunks and begin playback with chunk C6 upon that chunk's arrival at the client. If chunks C4 and C5 are not skipped (e.g., if chunks C4 and C5 are provided to the client in addition to C6) within the context of FIG. 6 according to the aforesaid techniques, the fragment-based playback latency would instead by approximately tR-t1 (as opposed to approximately tc-tb when chunks C4 and C4 are skipped).

In various embodiments, note that techniques similar to those described above with respect to FIG. 4 may be applied to the embodiment of FIG. 6. For instance, in the example embodiment of FIG. 4, the client requests the fragment that is currently being generated. Likewise, in FIG. 6, the client may also request the fragment that is currently being generated. As illustrated, instead of the content distribution system(s) waiting until the entire request fragment is generated before providing that fragment to the client (as is the case in the illustrated embodiment of FIG. 4), the embodiment of FIG. 6 may return the chunk that was being generated at the time of the client request (and in some cases one or more previous chunks of the same fragment, as described above).

In some embodiments, instead of requesting the current fragment (e.g., the fragment that is currently being generated) as described above in various embodiments, the client may instead request the next fragment (e.g., the next fragment to be generated). For instance, within the context of FIG. 6, instead of requesting fragment 302, the client may instead request fragment 304 to avoid receiving a partial fragment. In some cases, this may increase the start time of content playback (relative to the chunked embodiment of FIG. 6); however, requesting the next fragment may in some cases be useful for content encoded with a codec that utilizes key frames.

Figure 7A:
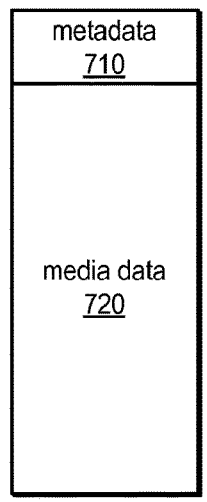
FIGS. 7A-7B illustrate block diagrams of example file formats of content according to some embodiments.
Figure 7B:
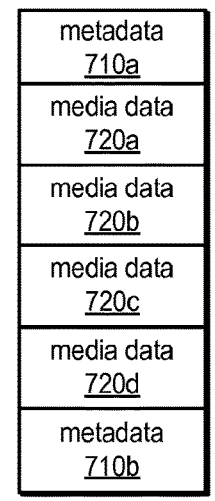

FIGS. 7A and 7B, which are described together herein, illustrate example file formats according to which content fragments may be generated, according to various embodiments. In various embodiments, the file format of FIG. 7A may be suitable for non-chunk based fragments whereas the file format of FIG. 7B may be suitable for chunk-based fragments, as described in more detail below. In the illustrated embodiment of FIG. 7A, the file representing the content described herein may include metadata 710 and media data 720. Metadata 710 may include information that specifies the location of random access points (e.g., key frames) within the fragment; this metadata may be referred to herein as an afra box. Metadata 710 may also include bootstrap information that indicates a mapping between time and fragment identifiers; this metadata may be referred to herein as the abst box. In various embodiments, the metadata may also include running metadata for interpreting media data, which may be referred to herein as the moof box. Media data 720 may include the actual data that represents the content of the fragment (e.g., the actual frames).

The file format of the fragment of FIG. 7B may be similar to that of FIG. 7A with certain structural changes. In the file format of FIG. 7B, at least some of the metadata may remain at the front of the fragment, as illustrated as metadata 710a, whereas other portions of the metadata may be moved to the end of the fragment, as illustrated as metadata 710b. In one non-limiting example, metadata 710a may represent the afra box described above whereas metadata 710b may represent the abst and moof boxes described above. In contrast to the single media data 720 of FIG. 7A, FIG. 7B may include dividing media data into multiple sub-portions or chunks 720a-720d. In various embodiments, these chunks may be sized to facilitate the chunked transfer of data fragments, such as the transfer of data fragments according to FIG. 6 described above. One non-limiting example of chunks 720a-720d may include mdat data or mdat boxes. For instance, media data 720 of FIG. 7A may represent a single mdat box according to various video file formats (e.g., F4V) and media data chunks 720a-720d of FIG. 7B may be the result of splitting such mdat box into multiple smaller mdat boxes. In one non-limiting example, each media data chunk 720a-720d may be sized such that the content distribution systems may implicitly serve each chunk 720a-720d as a chunk according to HTTP chunked encoding. In various embodiments, each chunk 720a-720b may be generated to represent equal time periods of content. Depending upon the variability of the bit rate, this may or may not mean that each chunk 720a-720b includes an equal number of frames. In various embodiments, the content may be encoded according to an inter-frame compression standard (e.g., MPEG-2, MPEG-4, H.264, etc.) that utilizes keyframes and non-keyframes that are dependent upon the keyframes. For instance, as described above, codecs utilized by the live encoder may utilize compression techniques on the content, such as those for reducing the data size of the content while retaining most or all of the original audio and/or video quality. In various embodiments, this may include encoding the content with a codec that utilizes inter-frame compression techniques that may result in the presence of key frames and frames that are dependent upon such key frames in order to be rendered. In various embodiments, these dependent frames may be expressed in terms of their differences relative to a keyframe.

In various embodiments, utilizing the file format of FIG. 7B, which includes media data sub-portions that may be transferred as chunks according to chunked transfer encoding, will ensure that the cache(s) 150 of the content distribution systems 130 remain coherence. For instance, by sizing each media data sub-portion appropriately, chunked transfer encoding of the content caches may be configured to implicitly serve each of these as chunks consistently across all caches.

Figure 8:
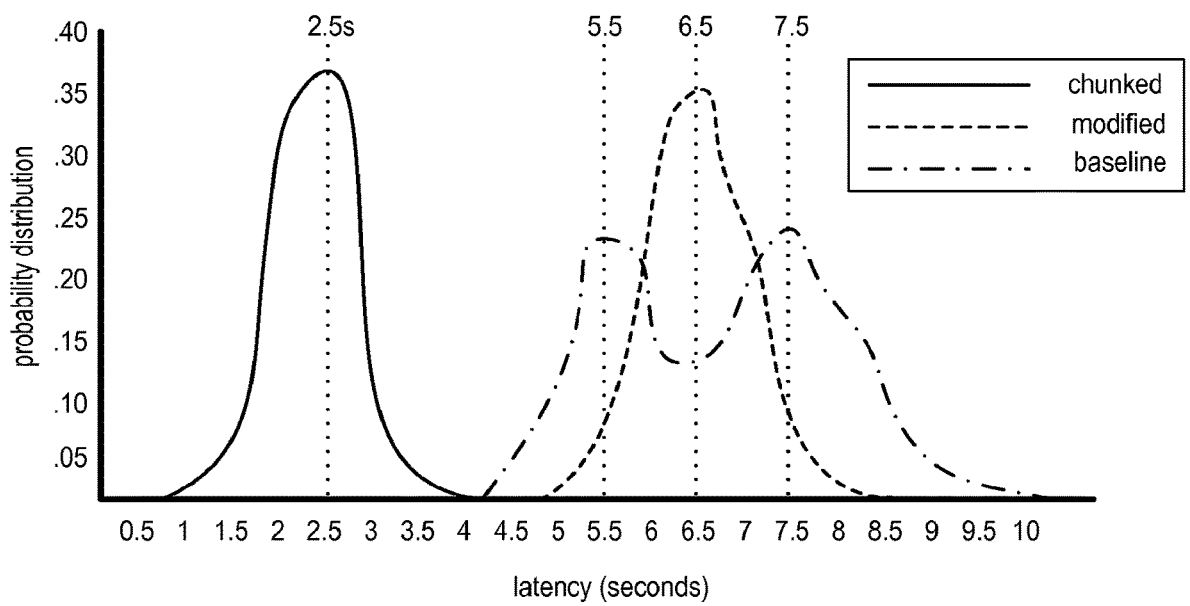
FIG. 8 illustrates an example probability distribution of latency for three different transfer techniques, according to some embodiments.

FIG. 8 illustrates one non-limiting example probability distribution of latency for three different transfer techniques, according to some embodiments. Note that the probability distributions are presented to illustrate streaming latency performance across different techniques described herein. The illustrated latencies are in no way limiting to the actual latency reductions that may be realized from utilizing the embodiments described herein. In the illustrated embodiment, a fragment length of 4 seconds is utilized and each fragment may include 4 one second chunks. Additionally, the probability distributions illustrated may be drawn from a relatively large sample of requests (e.g., 50+). In other embodiments, other fragment lengths and chunk lengths may be utilized. In the illustrated embodiment, the "chunked" probability distribution of latency corresponds to an embodiment utilizing chunked encoding and content distribution, such as that of FIGS. 5-6 described above. In the illustrated embodiment, the "baseline" probability distribution of latency corresponds to an embodiment that does not use chunked encoding, such as the embodiment of FIG. 3 described above. In the illustrated embodiment, the "modified" probability distribution of latency corresponds to an embodiment that does not utilize chunked encoding but does utilize forward-biased fragment acquisition, such as that of FIG. 4 described above (in which the client request fragment currently being generated). As can be readily seen from the illustrated embodiment, the latency introduced by the chunk-based encoding of fragment is less than the latency of the other two techniques.

In various embodiments, one characteristic of the chunk-based approach described herein is that fragment-based playback latency may be disassociated from fragment length. For instance, by utilizing the chunk-based approach described herein, the latency may depend more on the chunk width and less on the fragment width, as should be apparent within the illustrated embodiments described above, such as that of FIG. 6. Additionally, the load exerted on the server may be directly proportional to the number of client requests for fragments. In this way, by utilizing relatively long fragments that include many short chunks, embodiments may reduce the fragment-based playback latency while at the same time diminishing the load exerted on content distribution system(s) 130.

Figure 9A:
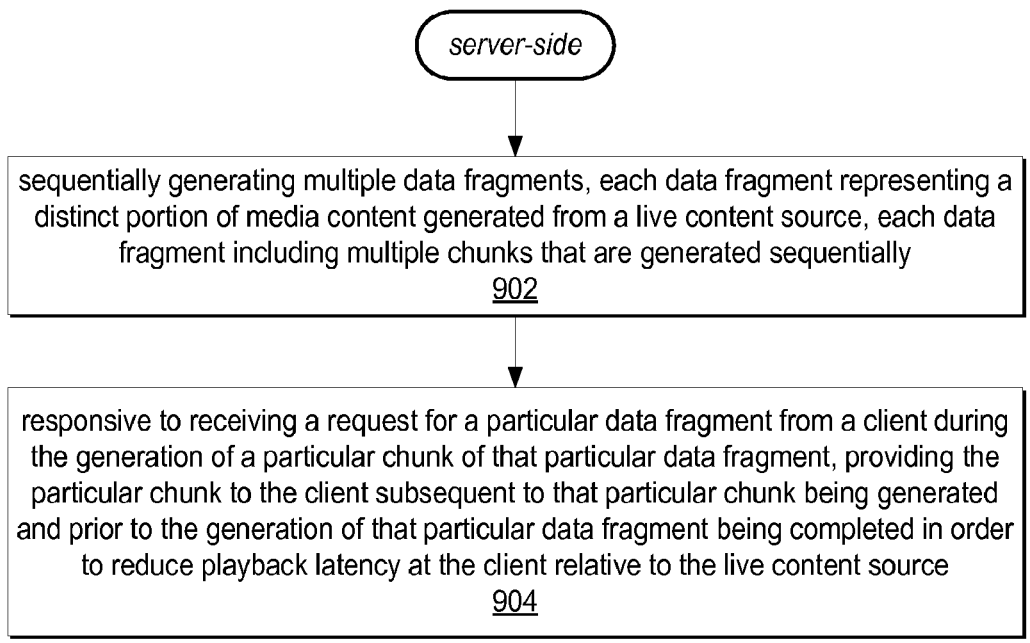
FIGS. 9A-9B illustrate example flowcharts for methods of utilizing chunk-based transfer of content streams to reduce latency, according to various embodiments.

FIG. 9A illustrates an example method for generating a providing data fragments using chunks, according to some embodiments. In various embodiments, the illustrated method may be performed by one or more computer systems, such as the computer system of FIG. 10 described below. In various embodiments, the illustrated method may be collectively performed by any of live encoder 110, content packager 120, and content distribution system(s) 130 (e.g., content server(s) 140, content cache(s) 150).

As illustrated at 902, the method may include sequentially generating multiple data fragments, each data fragment representing a distinct portion of media content generated from a live content source. In various embodiments, the method may also include generating each fragment on a chunk-by-chunk basis. For example, each data fragment may include multiple sub-portions that are generated sequentially. One example of content generated in this manner is illustrated in FIG. 6, described above. As illustrated, the content includes multiple fragments and each fragment includes multiple chunks.

As illustrated at 904, the method may include responsive to receiving a request (e.g., request 620) for a particular data fragment (e.g., fragment 302 of FIG. 6) from a client (e.g., client 170) during the generation of a particular chunk (e.g., chunk C6) of that particular data fragment, providing the particular chunk to the client subsequent to that particular chunk being generated and prior to the generation of that particular data fragment being completed. As described above, by providing chunks in this manner, clients need not wait for the entire fragment to be generated in order to receive and playback data (e.g., chunks) of that fragment. In various embodiments, this may reduce playback latency at the client relative to the live content source. For example, as described above with respect to FIG. 6, latency 630 is smaller than the latency present when a non-chunked approach is utilized.

Figure 9B:
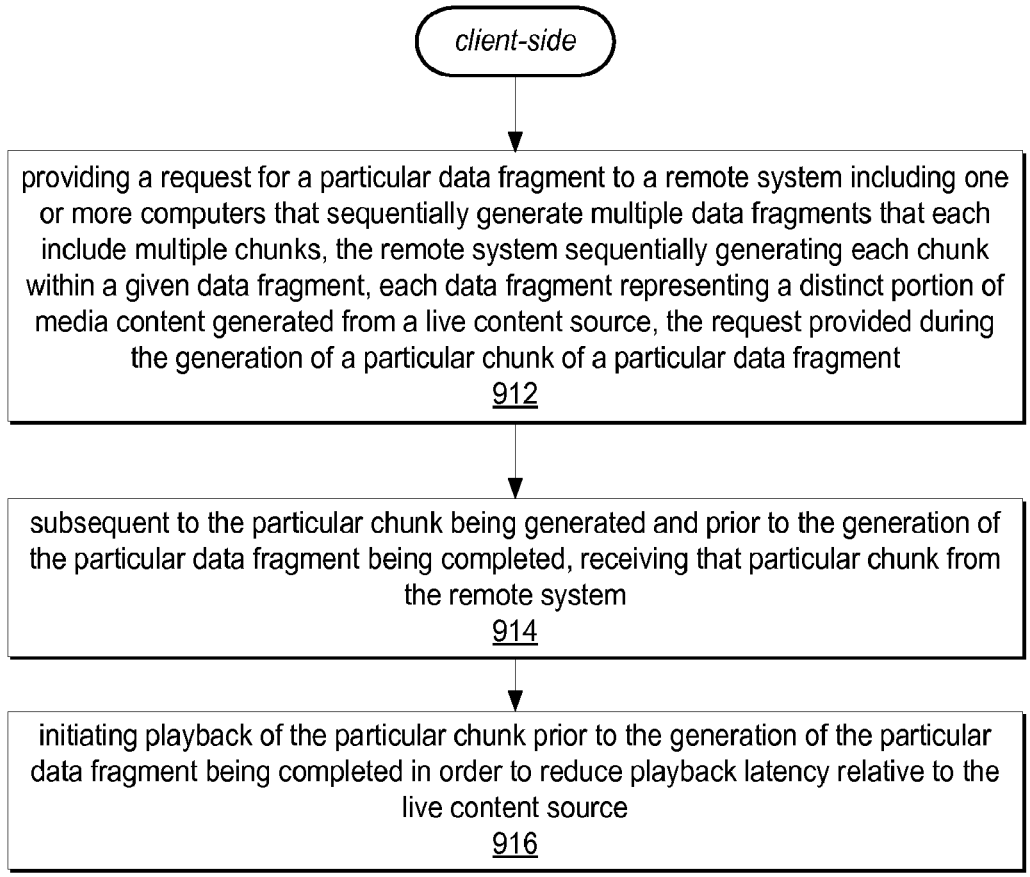

FIG. 9B illustrates an example method for receiving data fragments via a chunked protocol, according to some embodiments. In various embodiments, the illustrated method may be performed by one or more computer systems, such as the computer system of FIG. 10 described below. In various embodiments, the illustrated method may be performed a client, such as any of clients 170a-n described above.

As illustrated at 912, the method may include providing a request (e.g., request 620) for a particular data fragment (e.g., fragment 302 of FIG. 6) to a remote system (e.g., content distribution system(s) 130) including one or more computers that sequentially generate multiple data fragments that each include multiple chunks (e.g., chunks C0-C19 of FIG. 6). The remote system may sequentially generate each chunk within a given data fragment; each data fragment may represent a distinct portion of media content generated from a live content source (e.g., live content source 100). In various embodiments, the request is provided during the generation of a particular chunk (e.g., chunk C6 of FIG. 6) of a particular data fragment (e.g., fragment 302 of FIG. 6).

As illustrated at block 914, the method may include, subsequent to the particular chunk being generated and prior to the generation of the particular data fragment being completed, receiving that particular chunk from the remote system. For instance, as described with respect to FIG. 6 above, a client 170 may receive chunk C6 from the content distribution system(s) 130. As illustrated in FIG. 6, chunk C6 may be received by the client even before the fragment 302 has been completely generated.

As illustrated at block 916, the method may include initiating playback of the particular chunk prior to the generation of the particular data fragment being completed in order to reduce playback latency relative to the live content source. As described above, by providing chunks in this manner, clients need not wait for the entire fragment to be generated in order to receive and playback data (e.g., chunks) of that fragment. In various embodiments, this may reduce playback latency at the client relative to the live content source. For example, as described above with respect to FIG. 6, latency 630 is smaller than the latency present when a non-chunked approach is utilized. The method may include using a playback application (e.g., playback component 175a) in order to render the media data of the content and generate a representation on an electronic graphical display (e.g., display 1080 described below) and/or an audio transducer (e.g., one or more speakers).

Example Computer System

Various embodiments of a system and method for low-latency content streaming, as described herein, may be executed on one or more computer systems, which may interact with various other devices. One such computer system is computer system 1000 illustrated by FIG. 10, which may in various embodiments implement any of the systems, devices, elements or methods illustrated in FIGS. 1-9B. For instance, any of the functionality described above may be stored in memory as processor-executable program instructions 1022 (e.g., program instructions executable by processor(s) 1010). In one non-limiting example, computer system 1000 may be configured to implement any system or component described above including but not limited to live content source 100, live encoder 110, content packager 120, content distribution system(s) 130 (e.g., content server(s) 140, content cache(s) 150), and/or any of clients 170a-n. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x96, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or data 1032 accessible by processor 1010. In various embodiments, program instructions 1022 may be executable by the processor(s) to implement the functionality of any component or element described above, such as the components of FIG. 1. As illustrated, in various embodiments, data 1032 may store any data or information described herein, such as the content (e.g., fragments and chunks) described above. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the computer system, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1085), or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the process or methods described above, such as those of FIGS. 9A-9B. In other embodiments, different elements and data may be included.

Those skilled in the art will appreciate that computer system 1000 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, set top television boxes, pagers, and/or any other electronic device described herein. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
   sequentially generating multiple data fragments, each representing a distinct temporal segment of media content generated from a live content source, and each data fragment including multiple sub-portions representing smaller temporal segments of each data fragment;
   receiving a request for a data fragment from a client device during sequential generation of each sub-portion of the data fragment; and
   providing a sub-portion of the data fragment to the client device subsequent to the sub-portion being completed and prior to generation of a next sub-portion of the data fragment being completed in order to reduce playback latency from the live content source to the client device.

2. The computer-implemented method of claim 1, wherein the multiple data fragments represent different consecutive time periods of the media content from the live content source.

3. The computer-implemented method of claim 1, wherein the multiple sub portions within the data fragment represent different consecutive time periods of the media content represented by the data fragment.

4. The computer-implemented method of claim 1, wherein at least some of the multiple sub-portions are generated to represent an equal period of time of the media content.

5. The computer-implemented method of claim 1, wherein the media content generated from the live content source is encoded according to an inter frame compression standard utilizing key frames, the method further comprising generating each sub-portion of at least some of the multiple sub-portions to begin with a key frame, and subsequent frames within each respective multiple sub portion that begins with the key frame are dependent upon the key frame.

6. The computer-implemented method of claim 1, wherein providing the sub-portion of the data fragment to the client device comprises providing the sub-portion as a chunk according to chunked transfer encoding specified by Hypertext Transfer Protocol (HTTP).

7. The computer-implemented method of claim 6, wherein the media content generated from the live content source is formatted such that each sub-portion of a given data fragment maps to a single chunk according to the chunked transfer encoding.

8. A computer-implemented method, comprising:
   determining a data fragment to request for playback of the data fragment based on a time period that maps to the data fragment, the data fragment generated by a content distribution system that sequentially generates multiple data fragments, each representing a distinct temporal segment of media content generated from a live content source, and each data fragment including multiple sub-portions representing smaller temporal segments of a respective data fragment;
   transmitting a request for the data fragment to the content distribution system during sequential generation of each sub-portion of the data fragment at the content distribution system;
   receiving a sub-portion of the data fragment from the content distribution system subsequent to the sub-portion being completed and prior to generation of a next sub-portion of the data fragment being completed; and
   initiating the playback of the sub-portion of the data fragment prior to the generation of a next sub-portion of the data fragment being completed in order to reduce playback latency from the live content source.

9. The computer-implemented method of claim 8, further comprising:
   receiving additional sub-portions of the data fragment from the content distribution system as each sub-portion of the data fragment is sequentially generated.

10. The computer-implemented method of claim 8, wherein the multiple data fragments represent different consecutive time periods of the media content from the live content source.

11. The computer-implemented method of claim 8, wherein the multiple sub-portions within the data fragment represent different consecutive time periods of the media content represented by the data fragment.

12. The computer-implemented method of claim 8, wherein at least some of the multiple sub-portions are generated to represent an equal period of time of the media content.

13. The computer-implemented method of claim 8, wherein the media content is encoded according to an inter-frame compression standard utilizing key frames, at least some of the multiple sub-portions of the data fragment beginning with a key frame, and subsequent frames within each respective multiple sub-portion that begins with the key frame are dependent upon the key frame.

14. The computer-implemented method of claim 8, wherein receiving the sub-portion of the data fragment from the content distribution system as a chunk according to chunked transfer encoding specified by Hypertext Transfer Protocol (HTTP).

15. The computer-implemented method of claim 14, wherein the media content generated from the live content source is formatted such that each sub portion of a given data fragment maps to a single chunk according to the chunked transfer encoding.

16. A system implemented in a computer environment for low-latency content streaming, the system comprising:
- a memory to store multiple data fragments, each representing a distinct temporal segment of media content generated from a live content source, and each data fragment including multiple sub-portions representing smaller temporal segments of each data fragment;
- a processor system to implement a content distribution system at least partially in hardware as instructions executable by the processor system to:
- sequentially generate the multiple data fragments and the multiple sub-portions representing the smaller temporal segments of each data fragment;
- receive a request for a data fragment from a client device during sequential generation of each sub-portion of the data fragment; and
- provide a sub-portion of the data fragment to the client device subsequent to the sub-portion being completed and prior to the generation of a next sub-portion of the data fragment being completed in order to reduce playback latency from the live content source to the client device.

17. The system of claim 16, wherein:
- the multiple data fragments represent different consecutive time periods of the media content from the live content source; and
- the multiple sub-portions within the data fragment represent different consecutive time periods of the media content represented by the data fragment.

18. The system of claim 16, wherein the media content generated from the live content source is encoded according to an inter-frame compression standard utilizing key frames, at least some of the multiple sub-portions of the data fragment beginning with a key frame, and subsequent frames within each respective multiple sub-portion that begins with the key frame are dependent upon the key frame.

19. The system of claim 16, wherein the sub-portion of the data fragment is provided to the client device as a chunk according to chunked transfer encoding specified by Hypertext Transfer Protocol (HTTP).

20. The system of claim 19, wherein the media content generated from the live content source is formatted such that each sub-portion of a given data fragment maps to a single chunk according to the chunked transfer encoding.

* * * * *